United States Patent [19]
Goodman et al.

[11] Patent Number: 6,005,842
[45] Date of Patent: Dec. 21, 1999

[54] ENGINEERING ORDER WIRE

[75] Inventors: David Michael Goodman, St Albans, United Kingdom; Adonios Bitzanis, Ottawa, Canada; Dino Cosimo DiPerna; Clifford Townsend, both of Stittsville, Canada

[73] Assignee: Northern Telecom Limited, Montreal, Canada

[21] Appl. No.: 08/882,452

[22] Filed: Jun. 26, 1997

[51] Int. Cl.$^6$ .................................................. G01R 31/08
[52] U.S. Cl. ........................ 370/225; 370/221; 370/223; 370/224; 714/716; 714/712
[58] Field of Search ................................... 370/221, 222, 370/223, 224, 242, 243, 248, 249; 340/827, 825.05, 825.16; 714/716, 712, 715, 717

[56] References Cited

U.S. PATENT DOCUMENTS 5,412,652  5/1995  Lu .......................................... 370/85.12

*Primary Examiner*—Michael Horabik
*Assistant Examiner*—Binyam Tadesse
*Attorney, Agent, or Firm*—Lee, Mann, Smith, McWilliams, Sweeney & Ohlson

[57] ABSTRACT

An engineering order wire arrangement is provided for a synchronous telecommunications network comprising a plurality of nodes interconnected via transmission paths, each path accommodating a plurality of transmission channels. Engineering voice traffic is carried on a first overhead channel having a defined network route topology. A second overhead channel is used to define a model network having a a route topology identical to that of the first overhead channel. The model network is tested to determine its integrity, i.e. the absence of loops. If the model network is found to be defective, both networks are reconfigured.

11 Claims, 8 Drawing Sheets

LEFT SEGMENT    RIGHT SEGMENT

ENGINEERING ORDER WIRE

This invention relates to synchronous telecommunication networks and in particular to an arrangement and method for providing engineering order wires in such networks.

BACKGROUND OF THE INVENTION

A typical telecommunications network comprises a number of nodes interconnected by communications paths. The nodes incorporate equipment that requires commissioning on installation and periodic servicing either to effect repairs or to install new software. To facilitate this exercise, it is conventional to provide a voice communications channel between nodes to allow service engineers to communicate with each other. This voice channel, which is independent of the network and may thus be used during installation and testing, is generally referred to as an engineering order wire (EOW). Such a facility is of particular importance in synchronous (SDH or SONET) networks where it is necessary for engineers located at various system nodes to ensure synchronisation of those nodes when the system is set up.

Traditionally, when a long distance link comprising end stations and intermediate regenerator stations is installed, the engineering order wire is provided in the form of a "party line" which is private to the associated long distance link. Telephone terminals are provided at the end stations and at the regenerator station, and an engineer lifting the handset of any one of those telephones Is able to hear any speech on the line. To support the operation, means are provided for attracting the attention of personnel at the different sites along the line, e.g. by use of a simple code of one ring for site one, two rings for site two and so on.

The introduction of synchronous technology has greatly increased both the distances and the transmission rates that can be achieved by carrying the traffic over optical fibre links. Rather than go to the expense of providing a physically separate engineering order wire connection, it has been proposed to provide this facility in the form of overhead channels. Typically, two 64 kbit/s channels are allocated for this purpose. These channels are extracted/inserted at all sites where an order wire facility is to be provided. This arrangement however suffers from two disadvantages. Firstly, the engineering order wire traffic is carried on the main fibre transmission path. If that path is cut, then the engineering order wire communication is also lost at a time when it is most needed. Secondly, network topologies have evolved to such an extent that engineering communication along a single unbranched path is no longer adequate. For example, present day networks can now comprise meshes or hierarchies of ring systems. These complex topologies permit the formation of loops when an engineering order wire is connected as a party line. This can lead to positive feedback or "howl" preventing effective communication.

SUMMARY OF THE INVENTION

An object of the invention is to minimise or to overcome these disadvantages.

A further object of the invention is to provided an improved engineering order wire arrangement for a telecommunications network.

According to the invention there is provided an engineering order wire arrangement for a synchronous telecommunications network comprising a plurality of nodes interconnected via transmission paths each accommodating a plurality of transmission channels, the arrangement including means for allocating a first overhead channel for carrying said voice traffic, said first channel having a defined route, means for allocating a second overhead channel having a route identical to that of said first overhead channel, means for determining from said second channel the integrity of the route of said first channel, and means for reconfiguring the common route of said first and second channels when said first channel route is determined to be defective.

According to another aspect of the invention there is provided a method of carrying engineering order wire voice traffic in a synchronous telecommunications network comprising a plurality of nodes interconnected via transmission paths each accommodating a plurality of transmission channels, the method comprising allocating a first overhead channel for carrying said voice traffic, said first channel having a defined route, allocating a second overhead channel having a route identical to that of said first overhead channel, determining from said second channel the integrity of the route of said first channel, and reconfiguring the common route of first and second channels when said first channel route is determined to be defective.

According to a further aspect of the invention there is provided a method of providing a communications channel for engineering order wire voice traffic in a synchronous telecommunications network comprising a plurality of nodes interconnected via transmission paths each accommodating a plurality of transmission channels, the method comprising allocating a first overhead channel for carrying said voice traffic, said first channel having a defined route, allocating a second overhead channel having a route identical to that of said first overhead channel, breaking said second overhead channel at selected points in the network and injecting test signals at said points whereby to detect the presence of loops in the route of the second channel, breaking the first channel route at a said point responsive to the detection of a loop at that point, and reconfiguring the routing of said first and second channels by allocating a new common route thereto so as to provide a loop-free common route.

The arrangement and method employ a first overhead channel for the engineering order wire and a second overhead channel for the loop breaking/healing functions. The second overhead channel follows the same route as the first, but has no telephone connections and provides no access. The second overhead channel can thus function as a model without interference with any of the telephony functions. This second channel is then used as a test channel to determine the integrity of the route currently allocated to both channels.

The technique incorporates breaking and healing of the engineering ordrer wire network, where appropriate, to eliminate loops that could cause unwanted positive feedback.

Testing of the model network is performed by probes which are distributed around the network and which are adapted to open the model network and to introduce test signals thereto.

The use of a model network for test purposes eliminates the risk of interference with voice traffic when the testing is performed.

In one embodiment, the second or model overhead channel is tested by the application of a test signal thereto in the form of a continuous pseudo-random sequence, e.g. a Gold code. By detecting a return of this sequence via a correlation technique, the system can detect the presence of breaks and/or loops in the transmission path. If such faults are detected, an alternative route can be allocated.

In another embodiment, the test signal may comprise a burst of pseudorandom noise emitted by the probe.

BRIEF DESCRIPTION OF THE DRAWINGS

An embodiment of the invention will now be described with reference to the accompanying drawings in which.

DESCRIPTION OF PREFERRED EMBODIMENT

Figure 1:
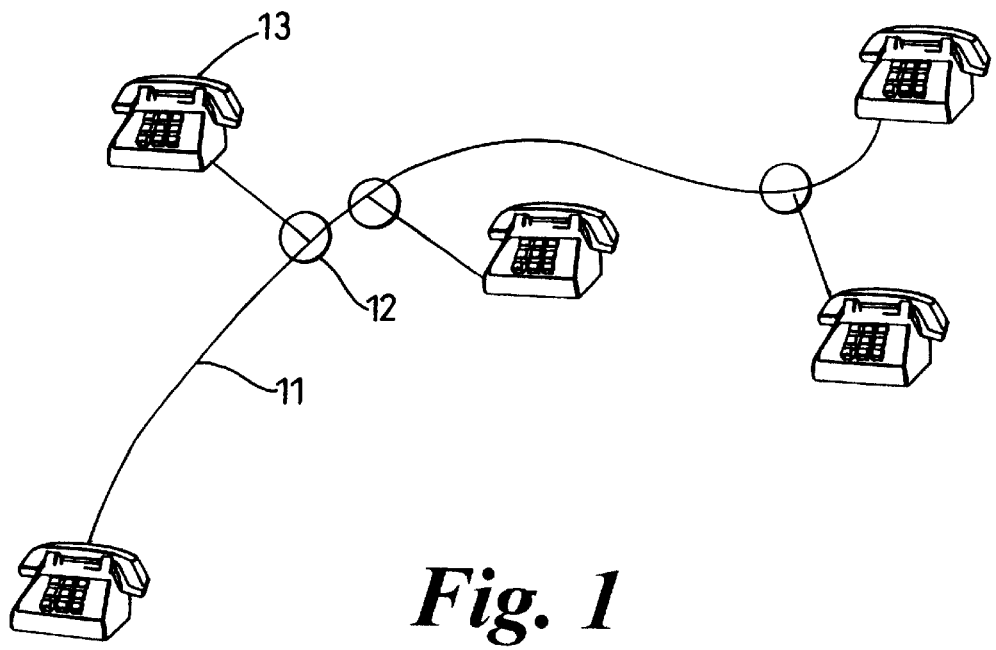
FIG. 1 is a schematic diagram of an engineering order wire party line arrangement serving a number of telephone sets.

Referring first to FIG. 1, this shows in highly schematic form the effective topology of an engineering order wire in a synchronous network. The topology shown is an idealised end to end route 11 having interfaces or bridges 12 to respective telephone sets or terminals 13 at various locations along the route. The engineering order wire functions as a party line to which each of the telephone sets has access. Thus, a conference can be set up between a number of terminals. It will be appreciated that although the path is depicted in FIG. 1 as a physical connection or circuit, it will in reality comprise an overhead channel allocated for that purpose.

Figure 2:
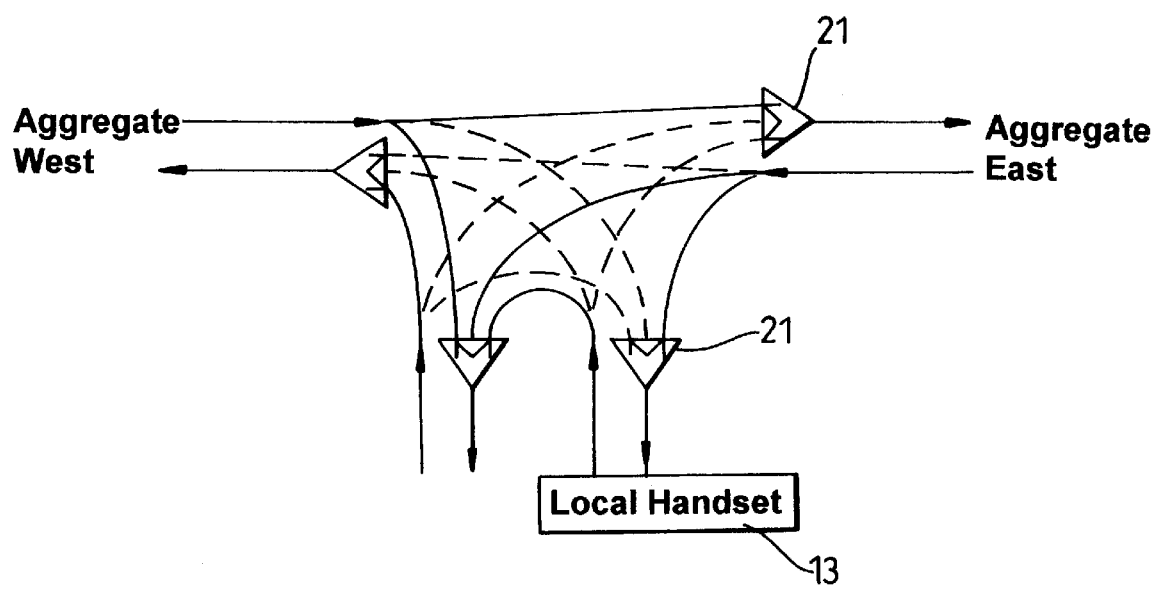
FIG. 2 shows the mechanism for accessing the engineering order wire of FIG. 1 from a telephone set.

FIG. 2 shows the way in which a telephone set 13 accesses the engineering order wire channel. Access is provided via a node multiplexer which has aggregate ports 21 and tributary ports (not shown). The figure illustrates the audio bridge function which for each agregate port provides the sum of all the inputs except its own so as to provide the party line function.

Figure 3:
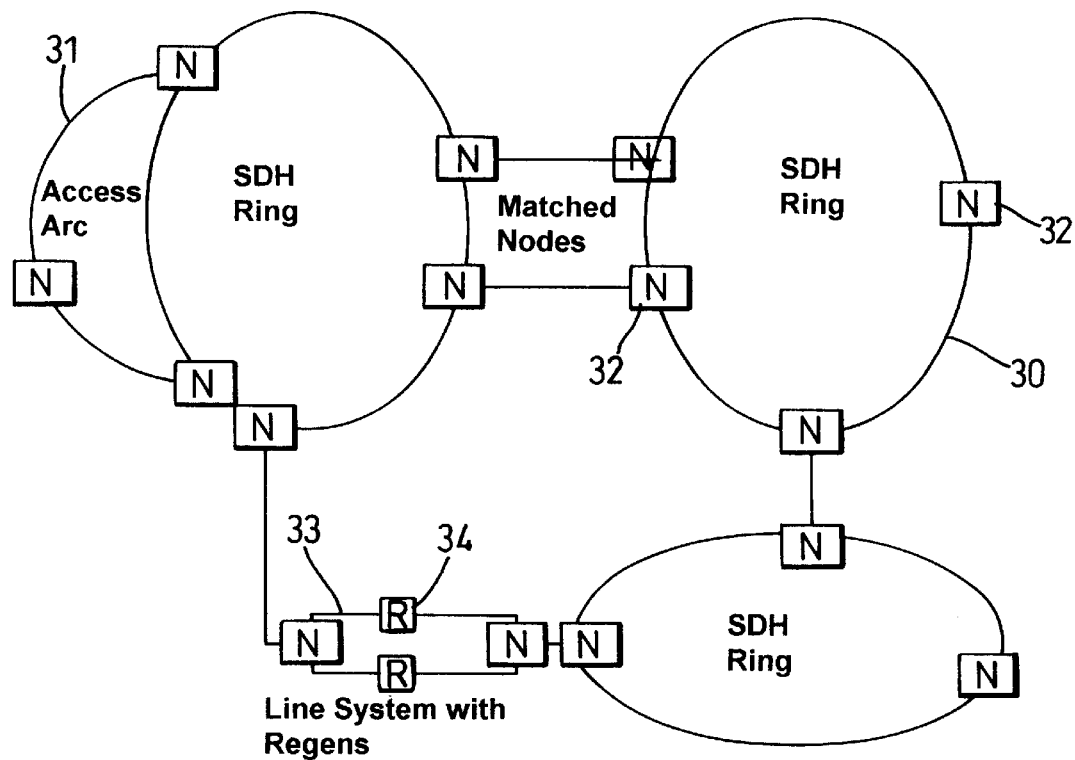
FIG. 3 illustrates an example of the general construction of a synchronous network provided with an engineering order wire facility.
Figure 4:
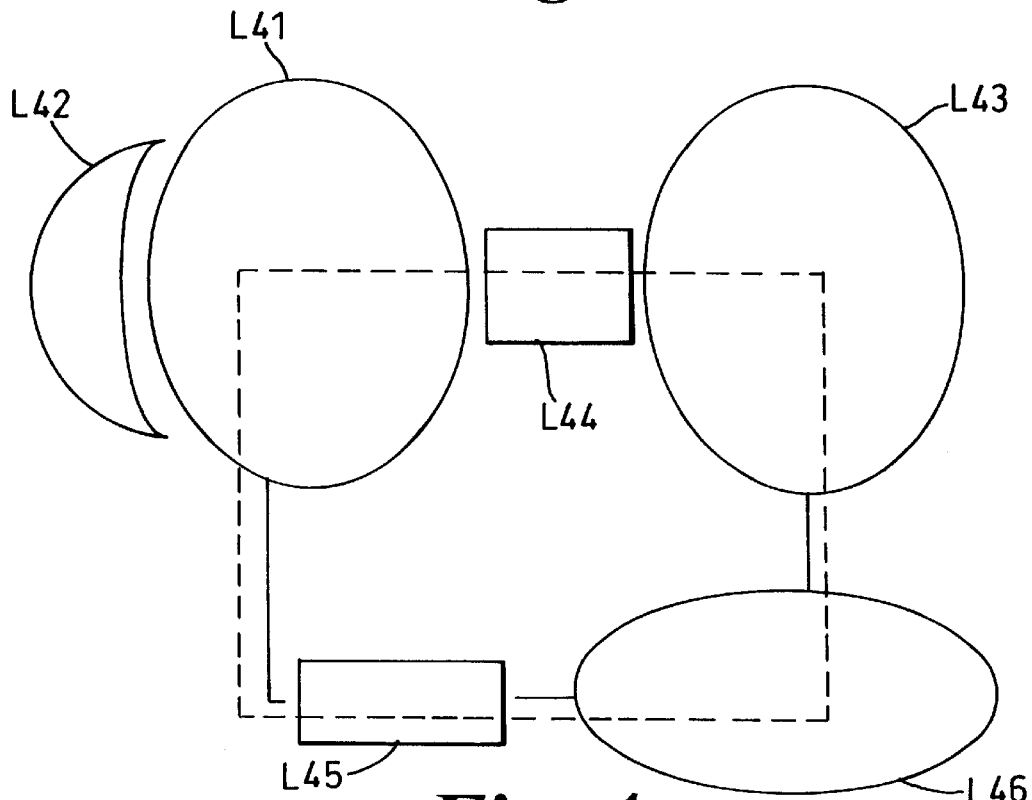
FIG. 4 shows the typical formation of an engineering order wire primary loops in the network of FIG. 3.

FIG. 3 shows in schematic form a synchronous, e.g. SDH or SONET network provided with an engineering order wire facility. The network comprises a number of rings 30 and access arcs 31 each having a plurality of nodes 32 where traffic can enter or leave the respective ring. The network may also incorporate for example a line system 33 having regenerators 34. Each system node 32 incorporates an engineering order wire bridge (FIG. 2) which bridges an engineering order wire channel between aggregates and tributaries. This arrangement can lead to the formation of a number of engineering order wire primary loops L41, L42 . . . L46 as illustrated in FIG. 4. Potentially, any of the loops shown in FIG. 4 could be detrimental to the operation of the system. Either an initial disturbance could accumulate around the loop causing DC saturation, or the propagation delay around the loop may be such as to permit oscillation or "howl" as a result of positive feedback.

To overcome these problems resulting from loop formation the engineering order wire arrangement comprises a first or primary voice network created by use of an overhead byte and bridges and to which voice access is provided, and a secondary or model network having a topology identical to that of the first and to which no voice access is provided. This may be effected via the following steps.

1. Use a second overhead byte and bridges to build the model engineering order wire network having a topology identical to that of the primary network.
2. Configure node or bridge software such that a fibre break in one direction results in a break in transmission in the opposite direction for both eow & model networks.
3. Probe the model network for loops and break the secondary network at appropriate points where loops are detected so as to remove those loops.
4. Break the primary network at points identical to those where the model network is broken so as to remove corresponding loops from the primary network.

Figure 5:
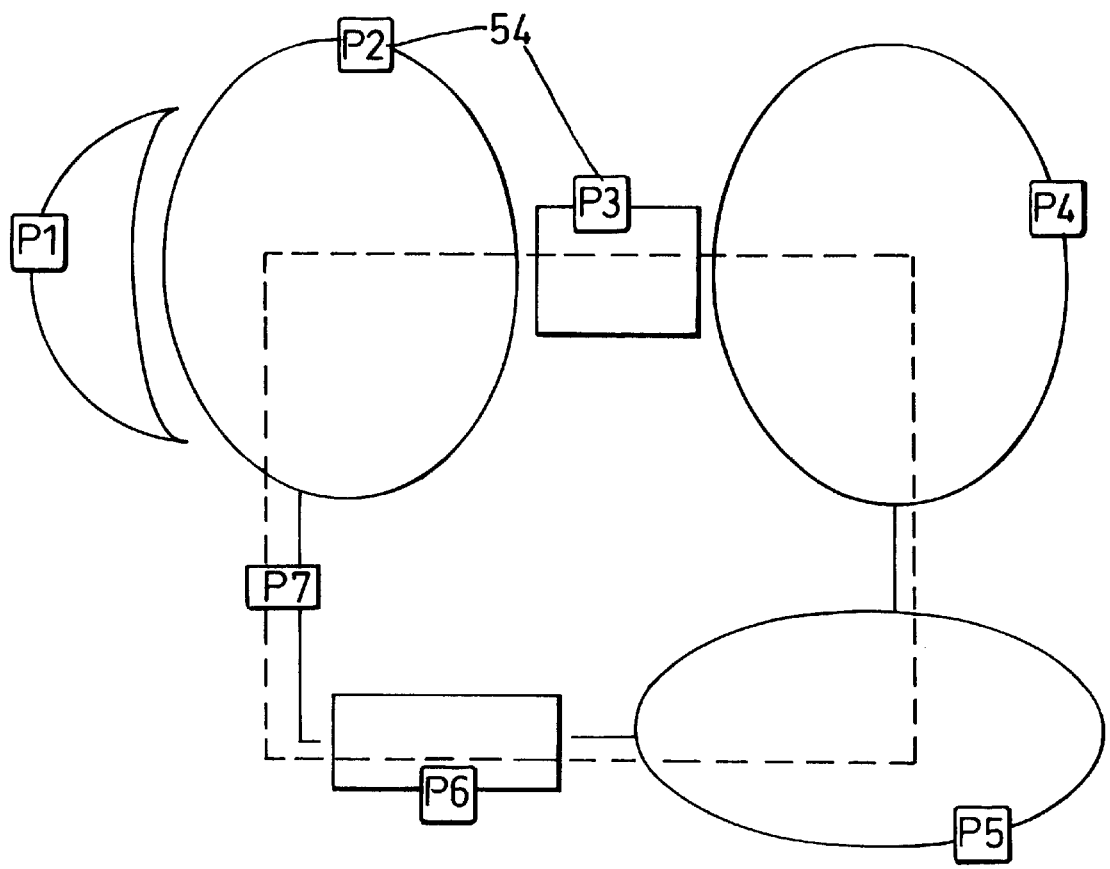
FIG. 5 shows an engineering order wire arrangement according to a preferred embodiment of the invention and applied to the network of FIG. 3.

FIG. 5 illustrates the way in which probes 54 may be distributed around a communications network to effect testing of the model network associated with the engineering order wire primary network. The probes are arranged such that there is one in each potential loop of the network. The model network is thus used, by operation of the probes, as a test model to determine the integrity of the primary network and to adjust the topology of the primary network.

Figures 6, 6A:
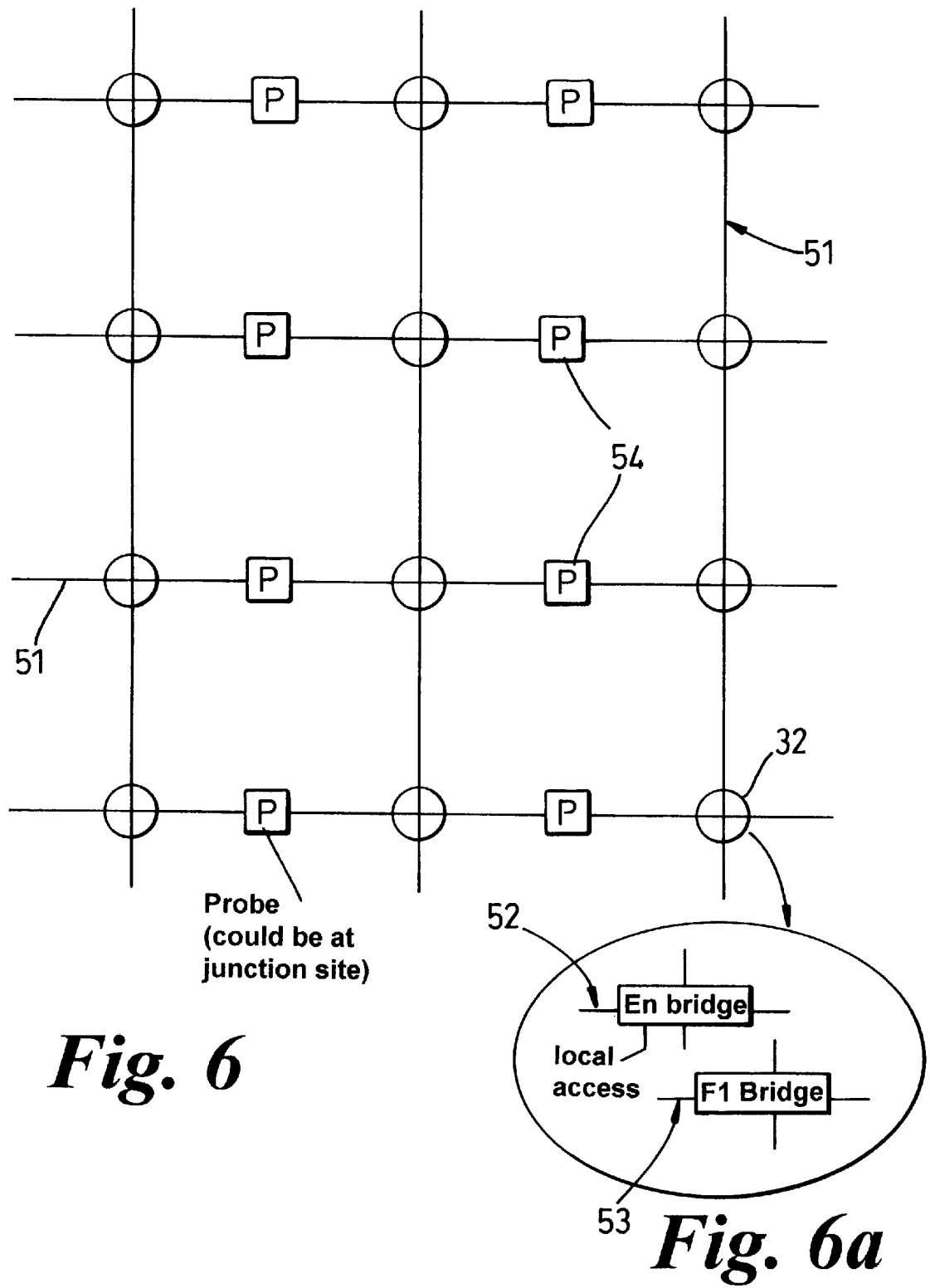
FIG. 6 illustrates the application of the engineering order wire arrangement of FIG. 5 to a mesh network topology.
FIG. 6a shows the detail of a node on the network of FIG. 6.

The technique is illustrated in more detail in FIGS. 6 and 6a which illustrate a mesh arrangement showing a construction of three networks, i.e. the transmission network, generally indicated as 51, carrying the revenue earning traffic, the engineering order wire primary (voice) network 52 (FIG. 6a) using e.g. the En channel and which is bridged at all junctions or nodes 32, and the model engineering order wire network 53 which provides no voice access and has a topology identical to that of the primary network 52.

The model network has a plurality of probes 54 disposed at various points around the network. The probes are distributed such that one probe is provided in each primary loop of the network. Each of these probes repeatedly tests the model network by effectively breaking that network at the probe location and transmitting test signals in both directions through the network. In one embodiment, these test signals comprise bursts of noise. Each probe, having transmitted its signal burst, then detects any corresponding received signal burst which may have travelled around a loop. The use of a noise burst for the transmitted signal overcomes the potential problem of corruption of the return signal by interference between returns from multiple loops. In another embodiment, each probe transmits a continuous pseudorandom signal, e.g. comprising a Gold code. Each probe is allocated its own unique code sequence. Detection of the signal as a result of circulation around a loop is effected by a correlation process thus recovering the signal from the background noise. If a return signal indicative of a loop is detected, the model network remains broken at the probe site and the primary engineering order wire network is also broken at this point. If no return signal is detected, the model network is recoupled at the probe site and the primary network is allowed to remain unbroken.

Where probes emitting continuous sequences are employed, they can operate simultaneously as each responds only to its own unique sequence. Where probes emitting pulsed signals are employed, these are operated selectively in a predetermined sequence to prevent interference of the signals from one probe with any other system probe. This is effected by allocating a unique serial number to each probe. This serial number determines a delay between initiation of a probing sequence and activation of a particular probe such that each probe operates in turn. The sequence commences with a short silent period, e.g. about one second, during which no probe transmits. The probes then transmit individually at regular intervals determined by their sequence number until the last probe in the sequence has performed its test function. This process detects the presence of loops so as to reconfigure the topology of the engineering order wire network appropriately, and may be repeated as necessary until all loops have been eliminated.

The probing sequence of the model network may be undertaken at setup or following a network modification. The probe sequence may also be initiated in response to positive feedback or "howl" in the primary engineering order wire network indicative of the establishment of a loop. This is a condition that requires immediate attention to break the primary network at appropriate points to eliminate the feedback. Alternatively, probing may be a continuous process to take account of minor network changes arising e.g. from local fault conditions and consequent rerouting of traffic.

Figure 7:
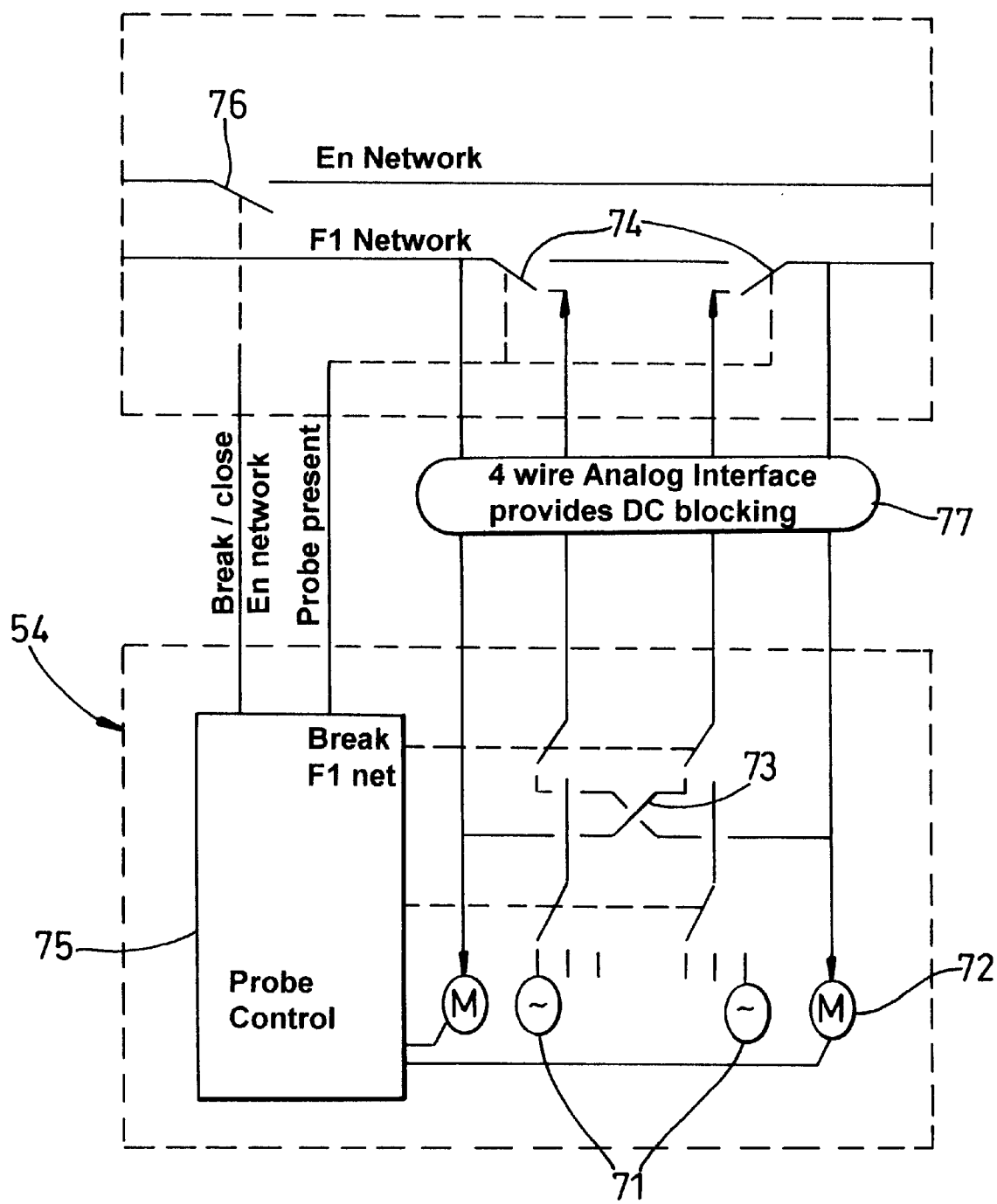
FIG. 7 shows an arrangement for applying test signals to the engineering order wire arrangement and for reconfiguring the network.

Referring now to FIG. 7, this illustrates an arrangement for coupling a probe to the model (F1) network and for controlling reconfiguration of the engineering order wire (En) network. The probe 54 incorporates one or more pairs of test signal generators 71, one member of each pair for each direction of the model network, and corresponding detectors 72 which respond to returned signals e.g. from a loop. Coupling of the signal generators or the detectors to the network is provided via a switch 73 disposed in the probe and a further switch 74 in the model network. The latter switch is operated via a control circuit 75 and is used to open or break the model network to effect the test procedure. A third switch 76 activated via the control circuit 75 is provided in the engineering order wire network to permit controlled breaking of that network. A four wire analogue interface 77 between the probe and the network provides direct current blocking.

The operation of the arrangement of FIG. 7 is as follows:
1. The model (F1) network is broken via the switch 74.
2. The probe injects signals in both directions into the broken network via the signal generators 71.
3. If no return signal is detected by the detectors 72, i.e. no loops are found, the model nertwork is closed via the switch 74.
4. If a loop is detected, the model network remains broken and the engineering order wire network is broken via the control circuit 75 and the switch 76.

Figure 8:
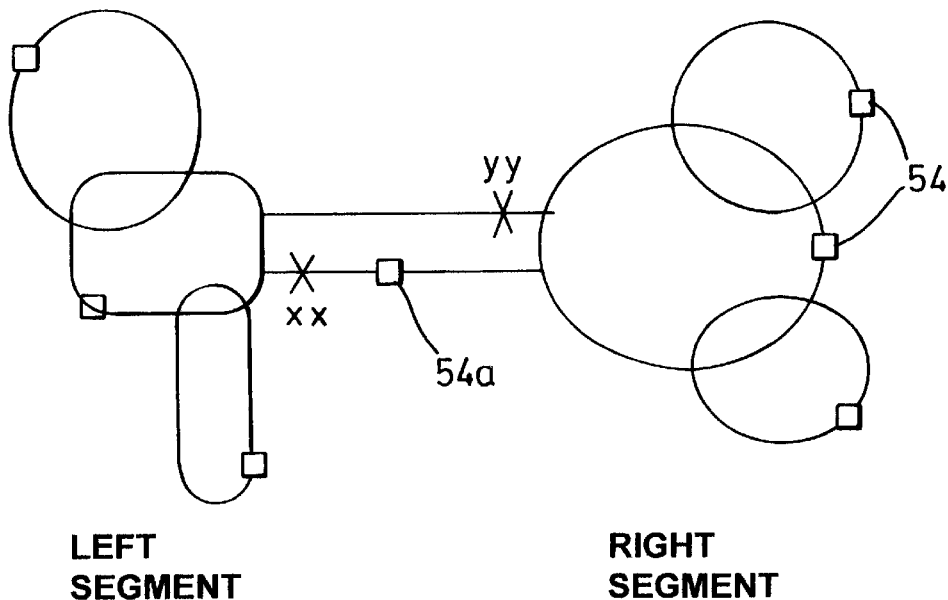
FIG. 8 shows a method of applying test signals to the engineering order wire arrangement to determine route integrity.

It will be appreciated that, under fault conditions in some network topologies, breaking of the model network at a particular point may separate that network into two disjoint parts. This is illustrated in FIG. 8 which depicts a network comprising a number of rings. It is assumed that this network is initially stable, i.e. there is no positive feedback, and has a fibre break or fault at XX. When the probe 54a disposed in one fibre of the link between the right and left halves of the network initiates its test procedure, it breaks the secondary network at that point. Assume now that maintenance action to repair the network at XX results in a new fault at YY in the other fibre of the link between the right and left halves of the network. The right and left halves of the model network are now separated by the break and by the operation of the probe 54a. Where such a situation can occur it will of course be necessary to co-ordinate the operation of the probes in the two parts of the network.

A practical implementation of the engineering order wire arrangement requires three elements:
Bridges and overhead access
Probe function
Phone function
These will be discussed below with reference to FIGS. 9 to 11.

Bridge and overhead access

Figure 9:
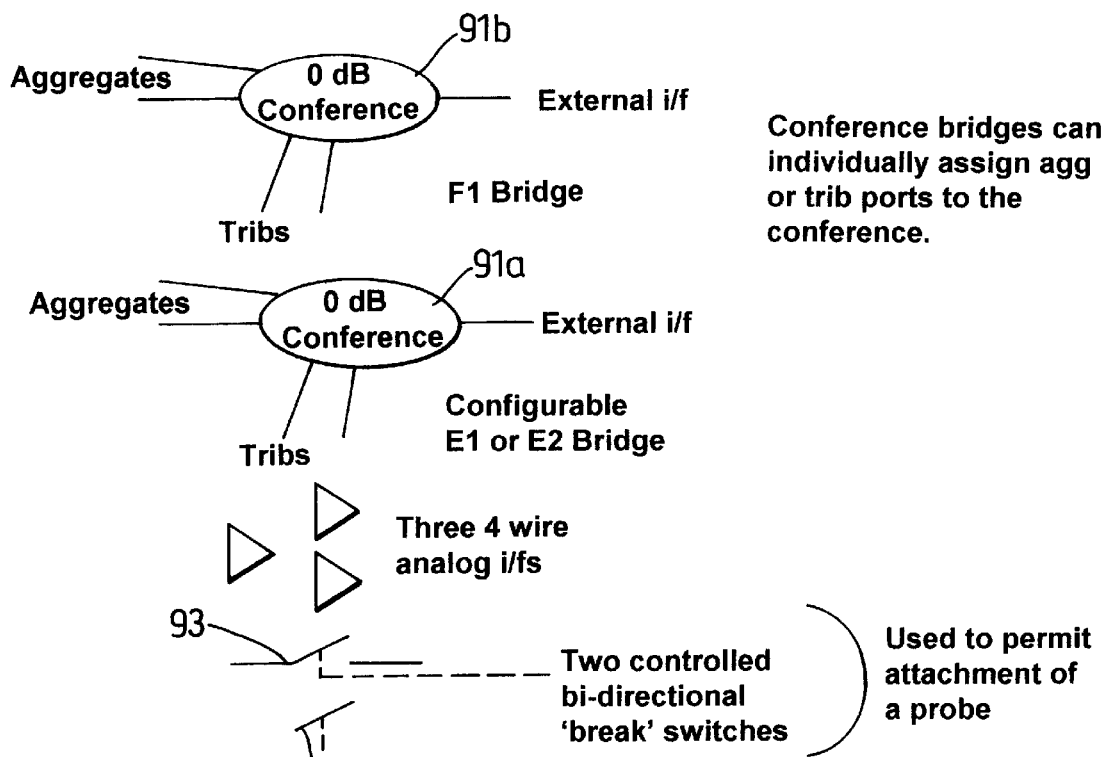
FIG. 9 illustrates a method of providing bridge and overhead access to the engineering order wire arrangement.
Figure 10:
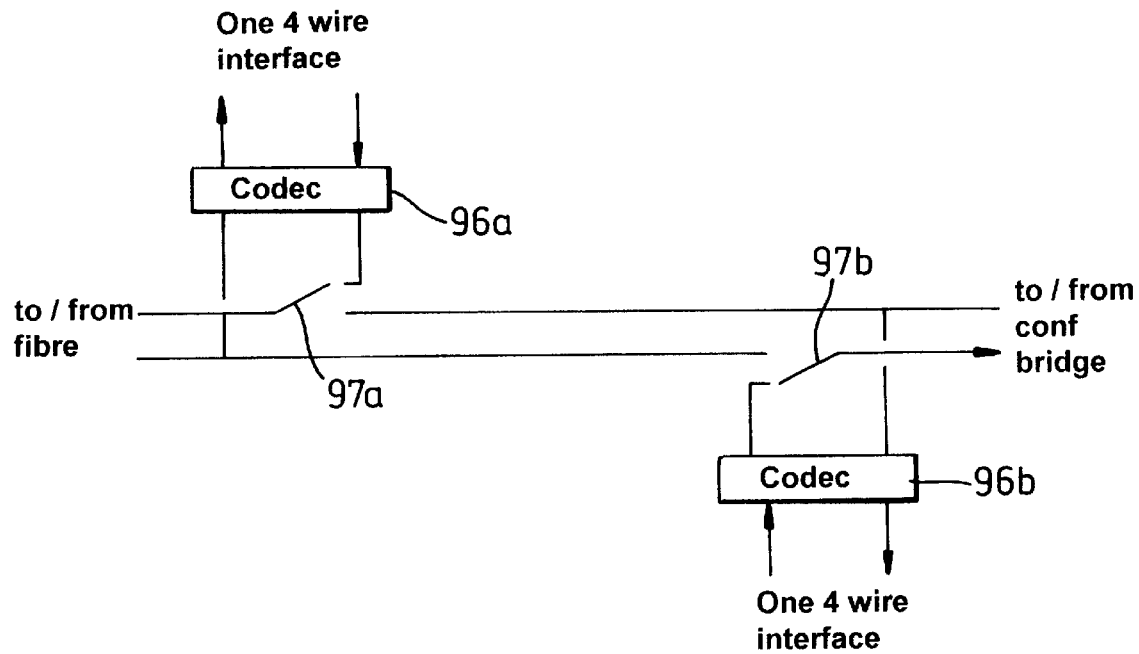
FIG. 10 shows the provision of a voice interface to the engineering order wire arrangement.
Figure 11:
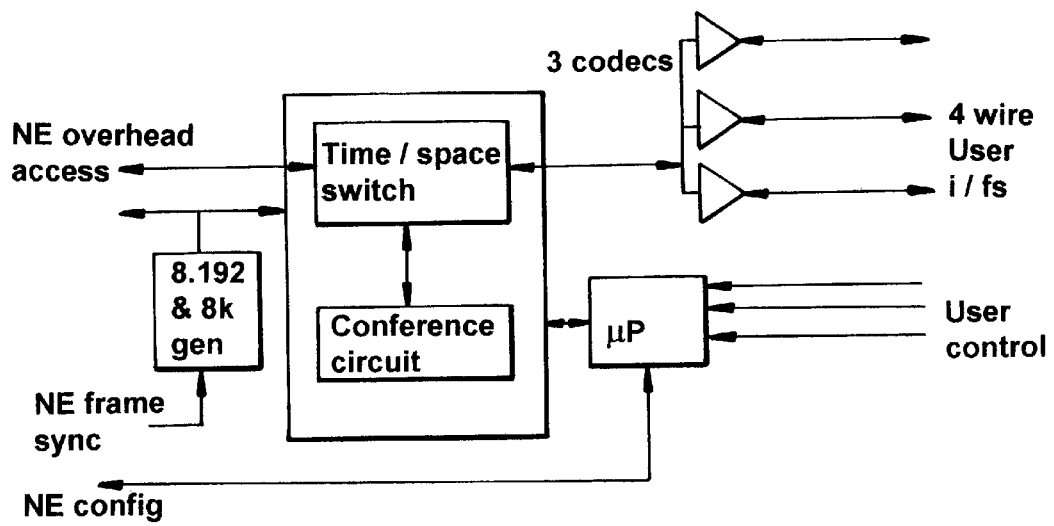
FIG. 11 shows an implementation of the voice interface of FIG. 10.

This function may be implemented digitally inside an equipment and is described in this context. A typical SDH multiplexer has aggregate and tributary ports providing access to 64 kbit/s overhead channels and fibre interfaces. The provision of the required functionality is illustrated in FIG. 9. In this arrangement, conference bridges 91a, 91b are used to individually assign aggregate or tributary ports to the conference, there being one bridge (91a) for the engineering order wire network and one (91b) for the model network. First and second controlled bi-directional break switches are used, one (93) to permit attachment of a probe, and the other (94) to permit the breaking of the engineering order wire under the control of the probe. Allocation of the audio interface is illustrated by way of example in FIG. 10 which illustrates the use of two codecs to support probe connection to the model network. An analogue interface codec (not shown) is assigned to the voice conference bridge. Two codecs 96a, 96b are assigned either side of the model (F1) network break. Switches 97a and 97b are opened only when a probe is present at that site and can be operated by a control signal from the probe. In addition, the probe can control voice break via a control signal as described above. A practical implementation of this arrangement is illustrated in FIG. 11 which shows a chip configuration supporting the functions of FIG. 9.

Figure 12:
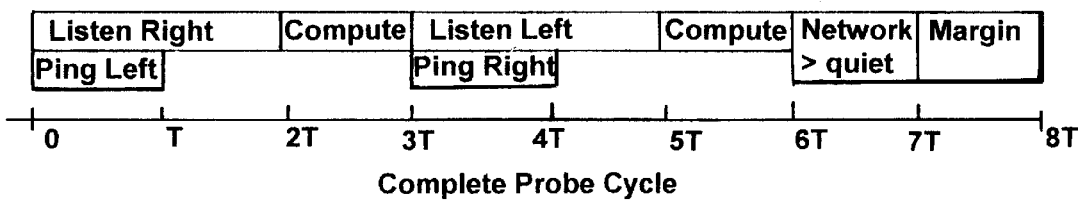
FIG. 12 shows a test or probe signal cycle.

FIG. 12 shows a typical burst mode probe test cycle. Each probe is arranged to signal on one interface and receive on the other. It then receives on the one interface and signals on the other. The two signal receive phases are separated by a compute/action phase in which the test data is analysed and the En and F1 networks are opened or closed as appropriate. A first guard period is provided at the start of each probe cycle and a second guard period is provided at the end of the cycle to allow for any timing inaccuracies between probes. The first guard period makes provision for the situation where the network has been divided into two portions by a fault.

Figure 13:
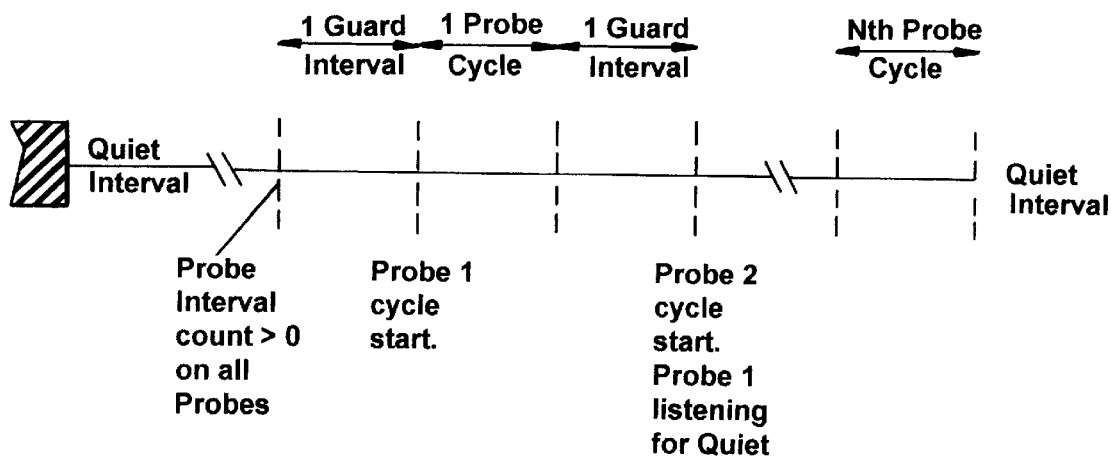
FIG. 13 illustrates the operation of the test signal cycle of FIG. 12.

As discussed above, the probes operate selectively in a sequence defined by the allocated sequence number of each probe. The sequence illustrated in FIG. 13 is preceded by a quiet interval after which each probe performs its test cycle in the sequence, each cycle starting with the first guard period and concluding with the second guard period as described above.

Figure 14:
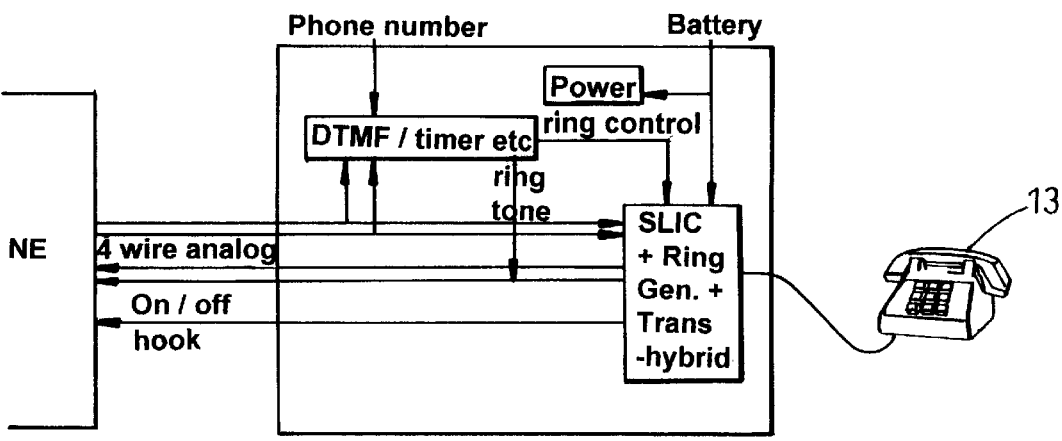
FIG. 14 illustrates the telephone function of the engineering order wire arrangement.

FIG. 14 shows the telephone (phone) function which provides an interface between a network element 121 and a conventional DTMF two-wire telephone set 131. The arrangement of FIG. 13 comprises a subscriber line interface which provides the standard telephone functions e.g. of battery feed, signalling and hybrid. A DTMF timer detects dial codes and rings the bell of the terminal if the corresponding dial code is recognised. The telephone function interfaces to the network element via a four wire analogue interface and a control channel, the latter carrying signals indicative of the on-hook/off-hook status of the attached telephone set. The network element responds to the on-hook status signal by muting the telephone input to a conference bridge to prevent noise build-up from on-hook telephones.

The network element 121 and the underlying transmission network provide a party line connection to all telephone functions in the engineering order wire network. All calling/signalling behaviour is controlled by the combination of the telephone functions and the respective DTMF telephones.

When a telephone set goes from its on-hook to its off-hook condition, it is immediately connected to the party line. Thus, if a telephone conversation is already taking place, the newcomer can join in that conversation from the time of connection. The calling/signalling behaviour of the telephone/telephone function have no influence on connectivity.

The calling/signalling behaviour of the telephone function is such as to recognise when its particular number is being called and to ring the bell or tone sounder of the telephone once for a pre-set period. The telephone function also provides for such facilities as Selective Call, Group Call and PSTN/PABX Call from a recognition of appropriate calling tones.

Further telephone functions are envisaged which permit interfacing the engineering order wire network with a public network or a PABX. In such circumstances, the telephone functions could be exposed to calling tones for PABX numbers and functions in addition to the calling tones which alert the telephone function at the PABX interface. This problem may be addressed by ensuring, e.g. by way of a timer, that each telephone function ignores all tones in a sequence after the first three tones which relate exclusively to engineering order wire functions.

It will be appreciated that, although the engineering order wire arrangement and method have been described with particular reference to SDH and SONET synchronous networks, it is not limited to those particular protocols but is of more general application to digital communications networks.

We claim:

1. An engineering order wire arrangement for carrying voice traffic in a synchronous telecommunications network comprising a plurality of nodes interconnected via transmission paths each said path accommodating a plurality of transmission channels, the arrangement including means for allocating a first overhead channel for carrying said voice traffic, said first overhead channel having a defined route, means for allocating a second overhead channel having a route identical to that of said first overhead channel, means for determining from said second channel the integrity of the route of said first and second channels, and means for reconfiguring the route of said first and second channels when said route is found to be defective, and wherein said route integrity determining means comprises a Plurality of probes distributed around said network and each adapted to apply test signals so the second channel so as to determine the integrity of said second channel from a response of that second channel to the applied test signals.

2. An engineering order wire arrangement as claimed in claim 1, wherein said test signals comprise a sequence of pulsed noise signals.

3. An engineering order wire arrangement as claimed in claim 1, wherein said test signals comprise a continuous pseudo-random sequence.

4. An engineering order wire arrangement as claimed in claim 3, wherein said pseudo-random sequence comprises a Gold code.

5. An engineering order wire arrangement as claimed in claim 2, and including means for controlling said probes such that the probes emit said test signals selectively and in a predetermined sequential order.

6. A method of carrying engineering order wire voice traffic in a synchronous telecommunications network comprising a plurality of nodes interconnected via transmission paths each said path accommodating a plurality of transmission channels, the method comprising allocating a first overhead channel for carrying said voice traffic, said first overhead channel having a defined route, allocating a second overhead channel having a route identical to that of said first overhead channel, determining from said second channel the integrity of the route of said first and second channels, and reconfiguring the route of said first and second channels when said route is found to be defective, and wherein said route integrity determination is effected via a plurality of probes distributed around said network and each adapted to apply test signals so the second channel so as to determine the integrity of said second channel from a response of that second channel to the applied test signals.

7. A method as claimed in claim 6, wherein said test signals comprise a sequence of pulsed noise signals.

8. A method as claimed in claim 7, wherein said test signals comprise a continuous pseudo-random sequence.

9. A method as claimed in claim 8, wherein said pseudo-random sequence comprises a Gold code.

10. A method as claimed in claim 7, wherein said probes emit said test signals selectively and in a predetermined sequential order.

11. A method of providing a communications channel for engineering order wire voice traffic in a synchronous telecommunications network comprising a plurality of nodes interconnected via transmission paths each accommodating a plurality of transmission channels, the method comprising allocating a first overhead channel for carrying said voice traffic, said first channel having a defined route, allocating a second overhead channel having a route identical to that of said first overhead channel, breaking said second overhead channel at selected points in the network and injecting test signals at said points whereby to detect the presence of loops in the route of the second channel, breaking the first channel route at a said point responsive to the detection of a loop at that point, and reconfiguring the routing of said first and second channels by allocating a new common route thereto so as to provide a loop-free common route.

\* \* \* \* \*